US011745766B2

(12) United States Patent
Sholingar et al.

(10) Patent No.: US 11,745,766 B2
(45) Date of Patent: Sep. 5, 2023

(54) UNSEEN ENVIRONMENT CLASSIFICATION

(71) Applicant: Ford Global Technologies, LLC, Dearborn, MI (US)

(72) Inventors: Gautham Sholingar, Sunnyvale, CA (US); Sowndarya Sundar, Mountain View, CA (US); Jinesh Jain, Pacifica, CA (US); Shreyasha Paudel, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 310 days.

(21) Appl. No.: 17/158,088

(22) Filed: Jan. 26, 2021

(65) Prior Publication Data

US 2022/0234617 A1 Jul. 28, 2022

(51) Int. Cl.
 *B60W 40/00* (2006.01)
 *B60W 60/00* (2020.01)
 (Continued)

(52) U.S. Cl.
 CPC ........ *B60W 60/0015* (2020.02); *B60W 30/09* (2013.01); *B60W 30/0956* (2013.01); *B60W 40/06* (2013.01); *B60W 50/0097* (2013.01); *G06F 16/285* (2019.01); *G06N 3/04* (2013.01); *G06N 3/08* (2013.01); *B60W 2420/42* (2013.01); *B60W 2555/20* (2020.02)

(58) Field of Classification Search
 CPC ............ B60W 60/0015; B60W 30/09; B60W 30/0956; B60W 40/06; B60W 50/0097; B60W 2555/20; B60W 2420/42; G06F 16/285; G06N 3/04; G06N 3/08
 USPC .......................................................... 701/26
 See application file for complete search history.

(56) References Cited

U.S. PATENT DOCUMENTS

2017/0270674 A1 9/2017 Shrivastava
2020/0034661 A1 1/2020 Kim et al.
(Continued)

OTHER PUBLICATIONS

Denninger et al., "Persistent Anytime Learning of Objects from Unseen Classes" 2018 IEEE/RSJ International Conference on Intelligent Robots and Systems (IROS), Oct. 1-5, 2018, Madrid, Spain.
(Continued)

*Primary Examiner* — Tyler J Lee
*Assistant Examiner* — Tiffany P Ohman
(74) *Attorney, Agent, or Firm* — Frank A. MacKenzie; Bejin Bieneman PLC

(57) ABSTRACT

A system comprising a computer including a processor and a memory, the memory including instructions such that the processor is programmed to: process vehicle sensor data with a deep neural network to generate a prediction indicative of one or more objects based on the data and determine an object uncertainty corresponding to the prediction and when the object uncertainty is greater than an uncertainty threshold, segment the vehicle sensor data into a foreground portion and a background portion. Classify the foreground portion as including an unseen object class when a foreground uncertainty is greater than a foreground uncertainty threshold; classify the background portion as including unseen background when a background uncertainty is greater than a background uncertainty threshold; and transmit the data and a data classification to a server.

20 Claims, 6 Drawing Sheets

(51) Int. Cl.
*G06F 16/28* (2019.01)
*G06N 3/04* (2023.01)
*G06N 3/08* (2023.01)
*B60W 30/095* (2012.01)
*B60W 30/09* (2012.01)
*B60W 40/06* (2012.01)
*B60W 50/00* (2006.01)

(56) References Cited

U.S. PATENT DOCUMENTS

2020/0167566 A1* 5/2020 Marder ............ G06V 10/25
2020/0167930 A1* 5/2020 Wang ............ G06T 7/0012
2020/0226430 A1* 7/2020 Ahuja ............ G06N 3/084

OTHER PUBLICATIONS

Gal et al., "Dropout as a Bayesian Approximation: Representing Model Uncertainty in Deep Learning", Proceedings of the 33 rd International Conference on Machine Learning, New York, NY, USA, 2016. JMLR: W&CP vol. 48.
Khan et al., "Fast and Scalable Bayesian Deep Learning by Weight-Perturbation in Adam", arXiv:1806.04854v3 [stat.ML] Aug. 2, 2018, Proceedings of the 35 th International Conference on Machine Learning, Stockholm, Sweden, PMLR 80, 2018.
Kingma et al., "Auto-Encoding Variational Bayes", arXiv:1312.6114v2 [stat.ML] Dec. 23, 2013.
Pearce et al."High-Quality Prediction Intervals for Deep Learning: a Distribution-Free, Ensembled Approach", Proceedings of the 35 th International Conference on Machine Learning, Stockholm, Sweden, PMLR 80, 2018.

* cited by examiner

UNSEEN ENVIRONMENT CLASSIFICATION

BACKGROUND

Deep neural networks (DNNs) can be used to perform many image understanding tasks, including classification, segmentation, and captioning. For example, convolutional neural networks can take an image as input, assign an importance to various aspects/objects depicted within the image, and differentiate the aspects/objects from one another.

BRIEF DESCRIPTION OF THE DRAWINGS

FIG. 6 is a flow diagram illustrating an example process for identifying an unseen scenario within data for which one or more deep neural networks have not been trained with.

BRIEF SUMMARY

Figure 1:
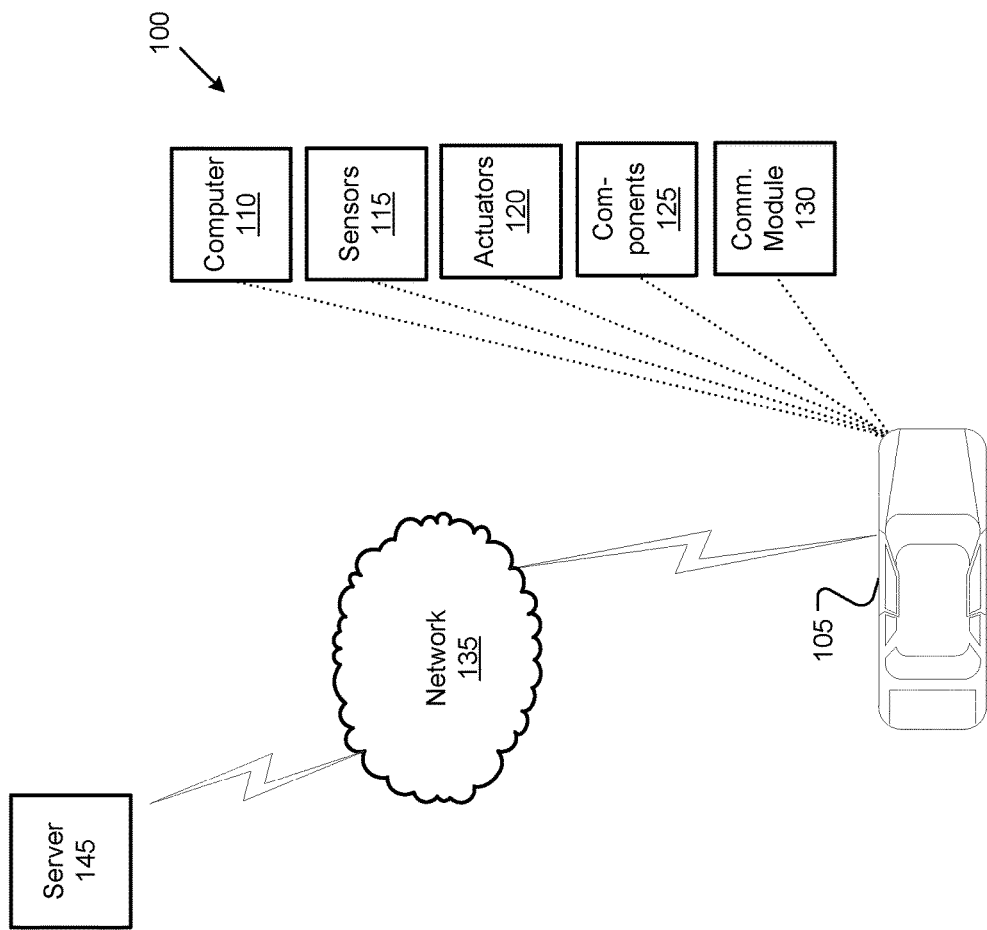
FIG. 1 is a diagram of an example system including a vehicle.

Autonomous vehicles typically employ perception algorithms to perceive the environment around the vehicle. The perception algorithms can use one or more deep neural networks to assist in detecting and/or classifying objects. As the vehicle's environment changes, the vehicle's perception system should be able to learn from unexpected results, such as a detected object that the perception system cannot confidently identify. Identifying data such as datasets with a domain shift or out-of-distribution datapoints can be challenging. A domain shift corresponds to a major change in a vehicle's environment. An out-of-distribution datapoint can be a previously unseen object in a familiar environment.

As discussed herein, a computer can implement a neural network that identifies data that include unseen scenarios. Unseen scenarios may be defined as new object classes, environmental conditions, or combinations of object classes and environmental conditions that were not included in data used to train the neural network. For example, features including unseen scenarios depicted within an image may cause the neural network to generate incorrect predictions. Vehicle sensor data corresponding to a scenario can be processed with a deep neural network to generate a prediction indicative of one or more objects based on the data and determine an object uncertainty corresponding to the prediction. Object uncertainty is a probability that the prediction indicative of one or more objects correctly identifies the one or more objects.

The neural network may utilize a probabilistic deep neural network, such as a Bayesian neural network or the like, to capture uncertain objects and/or backgrounds, which can identify a dataset shift and/or out-of-distribution data. After unreliable predictions have been identified, the data associated with the prediction may be annotated for more accurate predictions in the future. One measure of uncertainty in neural networks is epistemic uncertainty. Epistemic uncertainty is defined as a metric that measures how well a given input is represented in a training dataset. For example, epistemic uncertainty is indicative that the neural network has not been trained with enough training samples to permit the neural network to generate correct predictions. A correct prediction is a prediction that matches ground truth provided to the neural network during training. Ground truth is data determined by means independent of the neural network, for example by humans determining the contents of the input data provided to the neural network during training.

Disclosed herein is a method including processing vehicle sensor data with a deep neural network to generate a prediction indicative of one or more objects based on the vehicle sensor data and determine an object uncertainty corresponding to the prediction, then, upon determining that the object uncertainty is greater than an uncertainty threshold: segmenting the vehicle sensor data into a foreground portion and a background portion, classifying the foreground portion as including an unseen object class when a foreground epistemic uncertainty is greater than a foreground epistemic uncertainty threshold, classifying the background portion as including unseen background when a background epistemic uncertainty is greater than a background epistemic uncertainty threshold, and transmitting the data and a data classification to a server. The processor can be further programmed to operate a vehicle based on the prediction indicative of one or more objects. The object uncertainty can be a probability that the prediction indicative of one or more objects correctly identifies the one or more objects.

The foreground epistemic uncertainty can be a probabilistic measure of how well the one or more objects are represented in a training data distribution. The background epistemic uncertainty can be a probabilistic measure of how well noise factors are represented in a training data distribution, wherein noise factors include weather conditions, lighting conditions, and surface conditions. The foreground portion can be mapped to a latent representation, the latent representation can be mapped to a reconstruction of the foreground portion, and the foreground epistemic uncertainty can be determined based on a comparison of a reconstructed foreground portion with the foreground portion. The background portion can be mapped to a latent representation, the latent representation can be mapped to a reconstruction of the background portion; and the background epistemic uncertainty can be determined based on a comparison of a reconstructed background portion with the background portion. The vehicle sensor data can comprise at least one of an image or a point cloud. The deep neural network can include a probabilistic neural network. The vehicle sensor data can be segmented, via a segmentor, into the foreground portion and the background portion via a segmentation mask. The segmentation mask can comprise a binary mask that classifies objects within the vehicle sensor data, wherein the classified objects are assigned to the foreground portion. The segmentor can comprise a Mask R-convolutional neural network (Mask R-CNN). The object is can be a vehicle trailer and the deep neural network outputs a trailer angle. The trailer angle can describe a direction that the vehicle trailer will travel in response to backing up a vehicle.

Disclosed is a computer readable medium, storing program instructions for executing some or all of the above method steps. Further disclosed is a computer programmed for executing some or all of the above method steps, including a computer apparatus, programmed to process vehicle sensor data with a deep neural network to generate a prediction indicative of one or more objects based on the vehicle sensor data and determine an object uncertainty corresponding to the prediction, then, upon determining that the object uncertainty is greater than an uncertainty threshold: segment the vehicle sensor data into a foreground portion and a background portion, classify the foreground portion as including an unseen object class when a foreground epistemic uncertainty is greater than a foreground epistemic uncertainty threshold, classifying the background portion as including unseen background when a background epistemic uncertainty is greater than a background epistemic uncertainty threshold, and transmit the data and a data classification to a server. The processor can be further programmed to operate a vehicle based on the prediction indicative of one or more objects. The object uncertainty can be a probability that the prediction indicative of one or more objects correctly identifies the one or more objects.

The computer can be further programmed to determine the foreground epistemic uncertainty which can be a probabilistic measure of how well the one or more objects are represented in a training data distribution. The background epistemic uncertainty can be a probabilistic measure of how well noise factors are represented in a training data distribution, wherein noise factors include weather conditions, lighting conditions, and surface conditions. The foreground portion can be mapped to a latent representation, the latent representation can be mapped to a reconstruction of the foreground portion, and the foreground epistemic uncertainty can be determined based on a comparison of a reconstructed foreground portion with the foreground portion. The background portion can be mapped to a latent representation, the latent representation can be mapped to a reconstruction of the background portion; and the background epistemic uncertainty can be determined based on a comparison of a reconstructed background portion with the background portion. The vehicle sensor data can comprise at least one of an image or a point cloud. The deep neural network can include a probabilistic neural network. The vehicle sensor data can be segmented, via a segmentor, into the foreground portion and the background portion via a segmentation mask. The segmentation mask can comprise a binary mask that classifies objects within the vehicle sensor data, wherein the classified objects are assigned to the foreground portion. The segmentor can comprise a Mask R-convolutional neural network (Mask R-CNN). The object is can be a vehicle trailer and the deep neural network outputs a trailer angle. The trailer angle can describe a direction that the vehicle trailer will travel in response to backing up a vehicle.

DETAILED DESCRIPTION

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a conventional format, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles), etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known.

The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module 130 with devices outside of the vehicle 105, e.g., through a vehicle-to-vehicle (V2V) or vehicle-to-infrastructure (V2X) wireless communications to another vehicle, to (typically via the network 135) a remote server 145. The communications module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
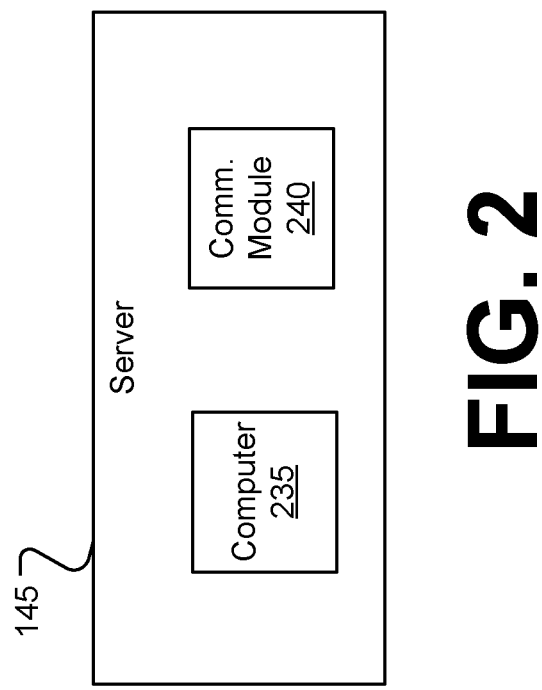
FIG. 2 is a diagram of an example server within the system.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 allows the computer 235 to communicate with other devices, such as the vehicle 105.

Figure 3:
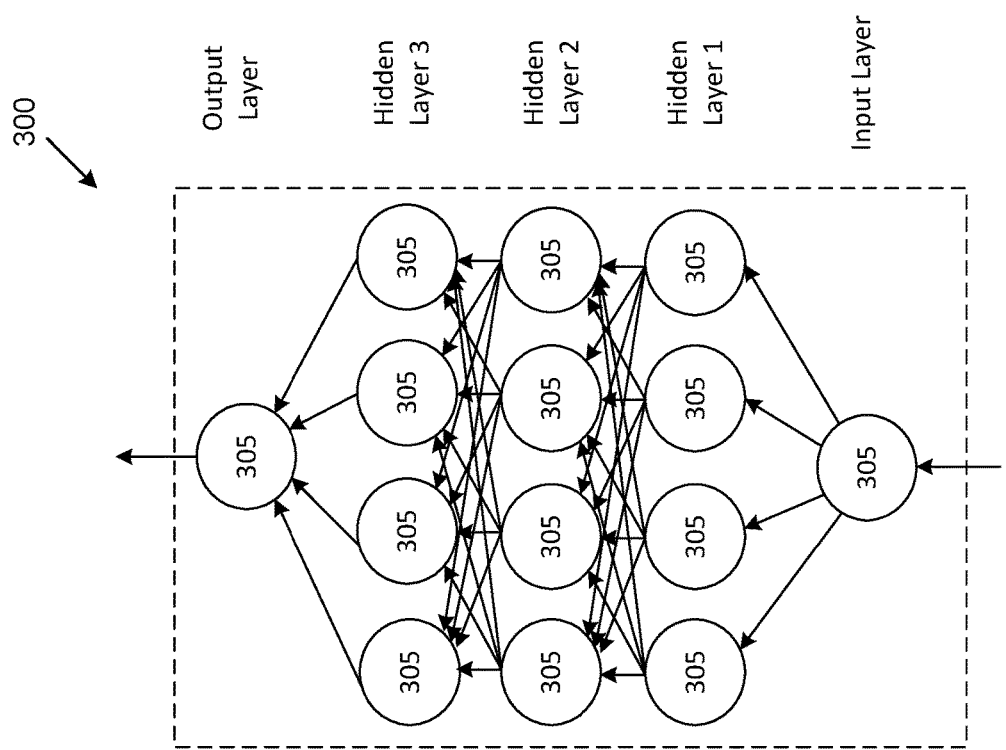
FIG. 3 is a diagram of an example deep neural network.

FIG. 3 is a diagram of an example deep neural network (DNN) 300. The DNN 300 may be representative of one or more neural networks described herein. The DNN 300 includes multiple nodes 305, and the nodes 305 are arranged so that the DNN 300 includes an input layer, one or more hidden layers, and an output layer. Each layer of the DNN 300 can include a plurality of nodes 305. While FIG. 3 illustrates three (3) hidden layers, it is understood that the DNN 300 can include additional or fewer hidden layers. The input and output layers may also include more than one (1) node 305.

The nodes 305 are sometimes referred to as artificial neurons 305, because they are designed to emulate biological, e.g., human, neurons. A set of inputs (represented by the arrows) to each artificial neuron 305 are each multiplied by respective weights. The weighted inputs can then be summed in an input function to provide, possibly adjusted by a bias, a net input. The net input can then be provided to activation function, which in turn provides a connected artificial neuron 305 an output. The activation function can be a variety of suitable functions, typically selected based on empirical analysis. As illustrated by the arrows in FIG. 3, artificial neuron 305 outputs can then be provided for inclusion in a set of inputs to one or more artificial neurons 305 in a next layer.

The DNN 300 can be trained to accept data as input and generate an output based on the input. The DNN 300 can be trained with ground truth data, i.e., data about a real-world condition or state. For example, the DNN 300 can be trained with ground truth data or updated with additional data by a processor. Weights can be initialized by using a Gaussian distribution, for example, and a bias for each node 305 can be set to zero. Training the DNN 300 can including updating weights and biases via suitable techniques such as back-propagation with optimizations.

Back-propagation is a technique that returns outputs from the DNN 300 to the input to be compared to ground truth corresponding to testing data. In this example, during training, a label and an obstruction probability can be back-propagated to be compared to the label and the obstruction probability included in the ground truth to determine a loss function. The loss function determines how accurately the DNN 300 has processed the DNN 300. The DNN 300 can be executed a plurality of times on foreground and background data while varying parameters that control the processing of the DNN 300. Parameters that correspond to correct answers as confirmed by a loss function that compares the outputs to the ground truth are saved as candidate parameters. Following the test runs, the candidate parameters that produce the most correct results are saved as the parameters that can be used to program the DNN 300 during operation. Ground truth data can include, but is not limited to, data specifying whether portions of an image are a foreground portion of the image or a background portion of the image. For example, the ground truth data may be data representing foreground and background data and corresponding labels. In an example implementation, pixels of an image can be classified such that pixels corresponding to an object or objects are categorized into a class, such as people, vehicles, signs, etc. The DNN 300 may be trained at the server 145 and provided to the vehicle 105 via the communication network 135. The DNN 300 may comprise one or more probabilistic neural networks, convolutional neural networks, autoencoders, variational autoencoders, sparse autoencoders, a recurrent neural network, a deconvolutional network, or the like that are discussed herein.

Figure 4:
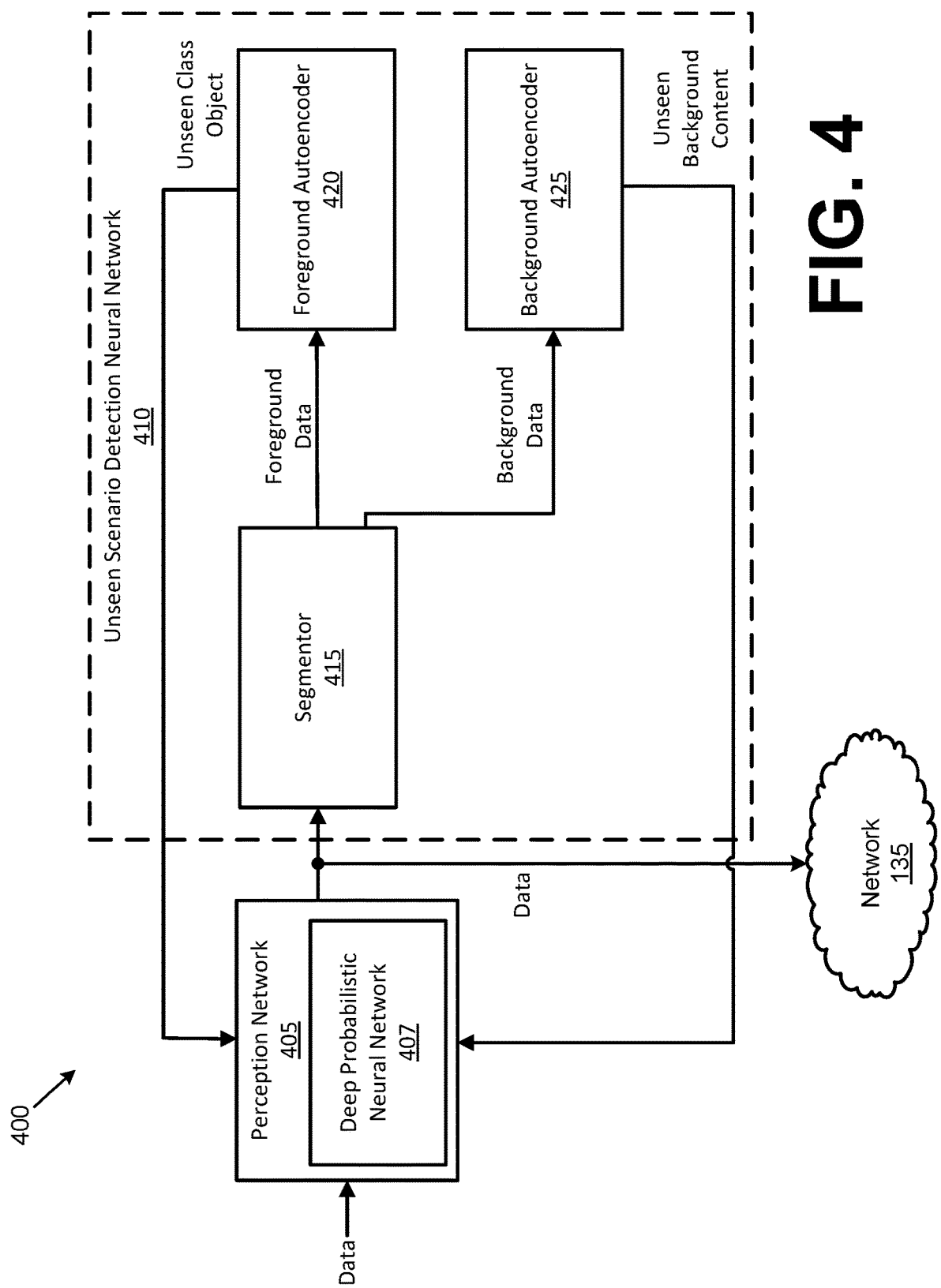
FIG. 4 is a diagram of an example perception network and unseen scenario detection neural network.

FIG. 4 illustrates an example deep neural network 400 of the vehicle 105 that includes a perception network 405 and an unseen scenario detection neural network 410. The perception network 405 can comprise one or more DNNs 300 that can detect and/or perceive an vehicle environment using sensor 115 data. The perception network 405 can receive data, such as sensor 115 data, and use a trained probabilistic neural network 407 to predict objects in the perceived vehicle environment. The probabilistic neural network 407 can be a trained deep neural network, e.g., a DNN 300, that receives data, e.g., an image or a point cloud, and generates a prediction indicative of one or more objects depicted within the data. For example, the probabilistic neural network 407 may be trained using conventional image detection and/or image classification techniques. Some data may be associated with objects that were not observed during a previous training of the perception network 405. As such, the probabilistic neural network 407 may not be able to identify one or more objects with a high level of certainty. As used herein, object classes may be defined as labels for particular objects predicted to be within the perceived vehicle environment.

The probabilistic neural network 407 can generate a prediction based on the received data and an epistemic uncertainty, which is described in greater detail below, corresponding to the prediction. The perception network 405 compares the epistemic uncertainty with an epistemic uncertainty threshold. If the data is associated with the epistemic uncertainty that is greater than the uncertainty threshold, the data is provided to the unseen scenario detection neural network 410 for further processing. The epistemic uncertainty thresholds discussed herein can be determined empirically during development of the probabilistic neural network 407 and/or the unseen scenario detection neural network 410. In an example implementation, the epistemic uncertainty thresholds can be determined using clustering techniques, anomaly detection techniques, or other similar techniques. These techniques can be applied to the predictions output by the probabilistic neural network 407 during training by comparing the predictions to ground truth data.

The unseen scenario detection neural network 410 includes a segmentor 415, a foreground autoencoder 420, and a background autoencoder 425. The unseen scenario detection neural network 410 receives the data from the perception network 405 to determine which portion of the data corresponds to an unseen scenario. The segmentor 415 segments the received data into background and foreground portions via conventional segmentation techniques. One or more objects depicted within the image can be detected based on segmentation of the image. For example, any discrete contiguous foreground portion may be identified as an object in the scene. In some examples, only contiguous foreground portions greater than a certain size, e.g., by number of pixels, are identified as an object in the scene.

The segmentor 415 uses a segmentation mask to define areas of the image as belonging to one or more foreground portions, e.g. a plurality of foreground pixels, and one or more background portions, e.g. a plurality of background pixels, of the image. In an example, the segmentation mask defines any area of the image that is not a foreground portion as belonging to the background portion. Accordingly, only one background portion may be defined. The segmentation mask may comprise a binary mask that classifies features or objects identified within an image or point cloud, and the classified features or objects are assigned to the foreground portion. In one or more implementations, segmentor 415 comprises a Mask R-convolutional neural network (Mask R-CNN). A Mask R-CNN adds a branch of convolutional layers for predicting a foreground mask in addition to the convolutional layers that predict the foreground. However, it is understood that the segmentor 415 may comprise other suitable neural networks that can classify similar features or objects depicted within the image and assign the classified object to the foreground portion of the image.

The autoencoders 420, 425 can comprise artificial neural networks trained to generate output data based on the input data. The autoencoders 420, 425 can each include an encoder that maps the input data to a latent representation and a decoder that maps the latent representation to a reconstruction of the input data. For example, the encoder compresses input data to a compressed representation of the data, and the decoder decompresses the compressed representation to the reconstruction of the input data. Each autoencoder 420, 425 can comprise a feed-forward neural network that generates an output based on the input and generates an epistemic uncertainty corresponding to the generated output. Uncertainty is a probabilistic measure of the reliability of prediction from the perception model. Epistemic uncertainty represents the uncertainty due to limited data and knowledge. In case of supervised neural networks, epistemic uncertainty gives a probabilistic measure of how well the input is represented in the training data distribution. The respective epistemic uncertainty metric for each autoencoder 420, 425 can be quantified by a reconstruction error corresponding to the input data.

During training, the foreground autoencoder 420 receives the foreground portion from the segmentor 415, determines an epistemic uncertainty corresponding to the foreground portion and maps the foreground portion to a latent representation. The foreground epistemic uncertainty is a probabilistic measure of how well objects are represented in a training data distribution. The foreground autoencoder 420 can determine a foreground epistemic uncertainty metric by comparing the reconstruction to the input foreground portion as discussed above. A foreground epistemic uncertainty threshold can be determined by observing a typical minimum value of the epistemic uncertainty determined for reconstructed foreground portions during training. At run time, following training, the foreground autoencoder 420 compares a determined foreground epistemic uncertainty with the previously determined foreground epistemic uncertainty threshold. The foreground autoencoder 420 classifies the foreground portion as including an unseen object class if the foreground epistemic uncertainty is greater than the foreground epistemic uncertainty threshold.

The background autoencoder 425 receives the background portion from the segmentor 415, maps the background portion to a latent representation, and maps the latent representation to a reconstruction of the background portion. The background autoencoder 425 can determine a background epistemic uncertainty metric by comparing the reconstruction to the input background portion. The background uncertainty is a probabilistic measure of how well noise factors are represented in a training data distribution, wherein noise factors include weather conditions, lighting conditions, and surface conditions. The background autoencoder 425 compares the background epistemic uncertainty with a background epistemic uncertainty threshold. The background epistemic uncertainty threshold can be determined as discussed above during training. The background autoencoder 425 classifies the background portion as including unseen background content if the background epistemic uncertainty is greater than the background epistemic uncertainty threshold.

The measure of accuracy versus uncertainty of predictions from previously trained DNNs are used to determine the epistemic uncertainty threshold. The epistemic uncertainty metric can be based on measuring the similarity between the reconstructed portion and the input or other image processing techniques such as determining image similarity include summed-square differences, correlation, and comparisons using neural networks. Epistemic uncertainty metrics for autoencoders, such as the foreground autoencoder 420 and the background autoencoder 425, can be calculated using various Bayesian learning techniques. The Bayesian learning techniques can include: Monte Carlo sampling methods; ensemble methods that train multiple probabilistic models with different initializations; and variational inference that fits a Gaussian variational posterior approximation over the weights of the autoencoders.

The perception network 405 can receive output from the autoencoders 420, 425 indicative of whether the input data includes an unseen object class or unseen background content. If the perception network 405 receives output indicating the data includes an unseen object class or unseen background content, the perception network 405 can transmit the data to the server 145 via the network 135. As discussed above, unseen object classes and unseen background content generally correspond to high epistemic uncertainties. See object classes and seen object classes generally correspond to low epistemic uncertainties. In examples where the latent representations output by the autoencoders do not include an unseen object class or unseen background content, but the overall epistemic uncertainty determined by perception network 405 is high, the output can be flagged for manual review and provided to the server 145. The perception network 405 may be retrained with data with labels indicating an object class and/or background content and provided to the vehicle 105 once retrained.

A deep neural network 400 that includes a perception network 405 and an unseen scenario detection neural network 410 can improve operation of a vehicle 105 by providing outputs indicating that the input data includes an unseen object class or unseen background class. The presence of an unseen object class or unseen background class can indicate that the output result, for example a trailer angle, from the deep neural network 400 has high epistemic uncertainty and therefore the output result may not be reliable. A high epistemic uncertainty is defined by a user based on experience and can be an uncertainty greater than 50%, for example. In examples where the deep neural network 400 indicates a high epistemic uncertainty, a computer 110 in a vehicle 105 can determine that the reliability of the result is not sufficient to permit the computer 110 to operate the vehicle 105. For example, the computer 110 can stop the vehicle 105 from backing up with an attached trailer when the epistemic uncertainty corresponding to the trailer angle 504 is greater than a 50% threshold, indicating that the deep neural network 400 has not correctly determined the trailer angle 504. The epistemic uncertainty threshold can be selected by a user based on testing the deep neural network 400 using real world data. The output data regarding the unseen object class and the unseen background class can be uploaded to a server 145 to permit the server 145 to retrain the deep neural network 400 based on the unseen object class and the unseen background class. The retrained deep neural network 400 can be subsequently downloaded to the computer 110 in the vehicle 105 to permit the computer 110 to process the input data that includes the unseen object class and the unseen background class with less epistemic uncertainty.

In examples where the deep neural network 400 indicates a low epistemic uncertainty, for example where the epistemic uncertainty is less than the 50% threshold, the output from the deep neural network 400 can be used to operate the vehicle 105. An example of operating a vehicle 105 based on deep neural network 400 output is when the deep neural network 400 outputs a trailer angle 504 in response to an input image from a vehicle sensor 115. As discussed above, a trailer angle 504 indicates an angle that a vehicle axis formed parallel with the direction of travel of the vehicle 105 makes with a trailer axis formed parallel with the direction of travel of the trailer's wheels. The trailer angle 504 can be measured at a point of attachment of the trailer to the vehicle 105, for example at the trailer hitch. The trailer angle 504 describes the direction that the trailer will travel in response to backing up the vehicle 105 in a direction determined by the vehicle steering, brakes and powertrain. A computer 110 in a vehicle can determine, based on the trailer angle, the proper commands to be sent to controllers for vehicle steering, brakes, and powertrain to move the trailer into a desired location, for example a parking spot.

Figure 5:
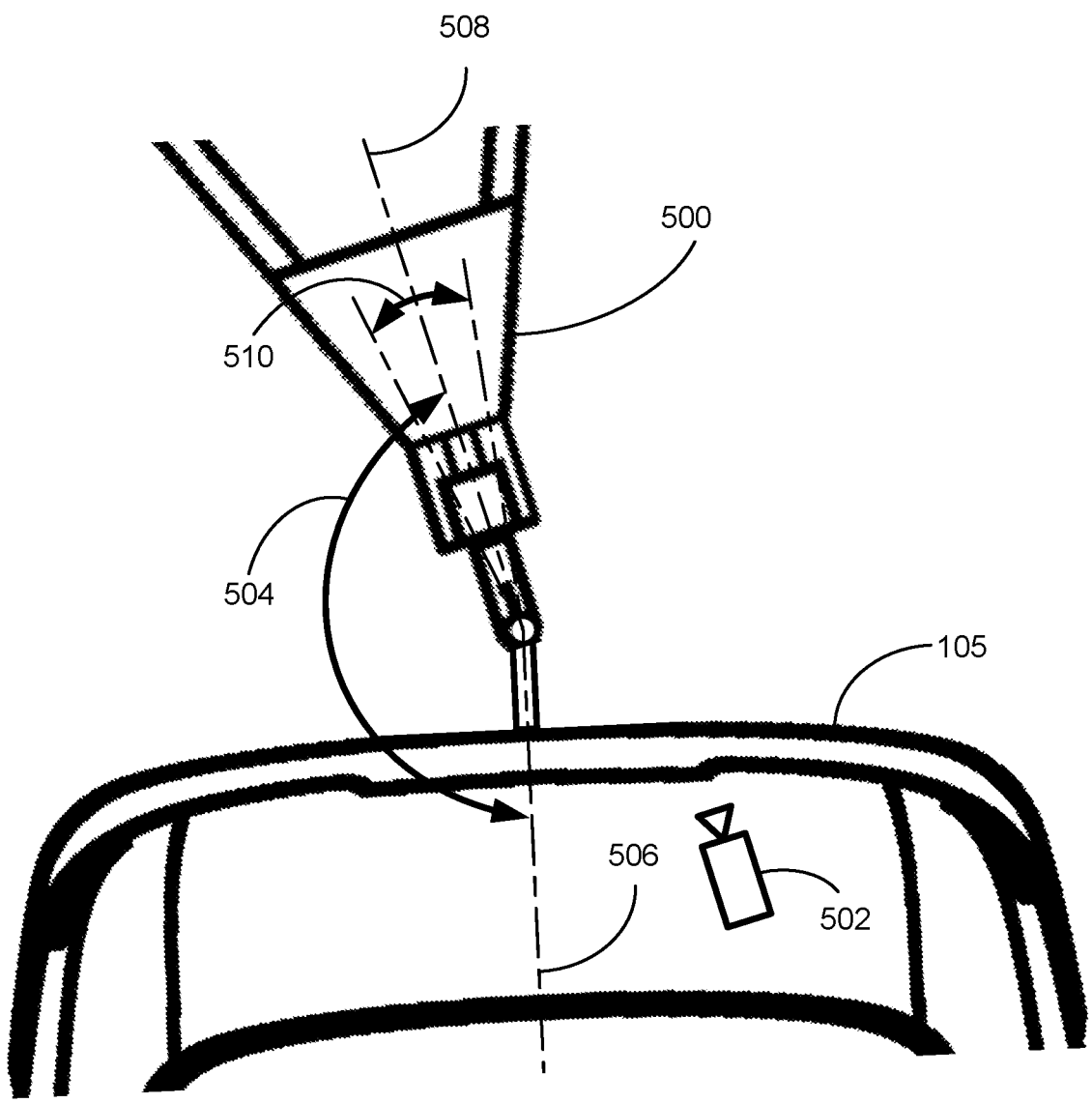
FIG. 5 is a diagram of an example vehicle trailer.

FIG. 5 is a diagram of a vehicle trailer 500 attached to a vehicle 105. An image of the vehicle trailer 500 can be acquired by a video camera 502 included in the vehicle 105 for processing with a deep neural network 400 as discussed above in relation to FIG. 4. The deep neural network 400 can determine a trailer angle 504, which can be an angle determined with respect to a centerline 506 of the vehicle 105 and a centerline 508 of the vehicle trailer 500. Epistemic uncertainty 510 is illustrated by the arrow indicating a range of possible trailer angles that can be determined by the deep neural network 400 based on an image acquired by video camera 502.

Figure 6:
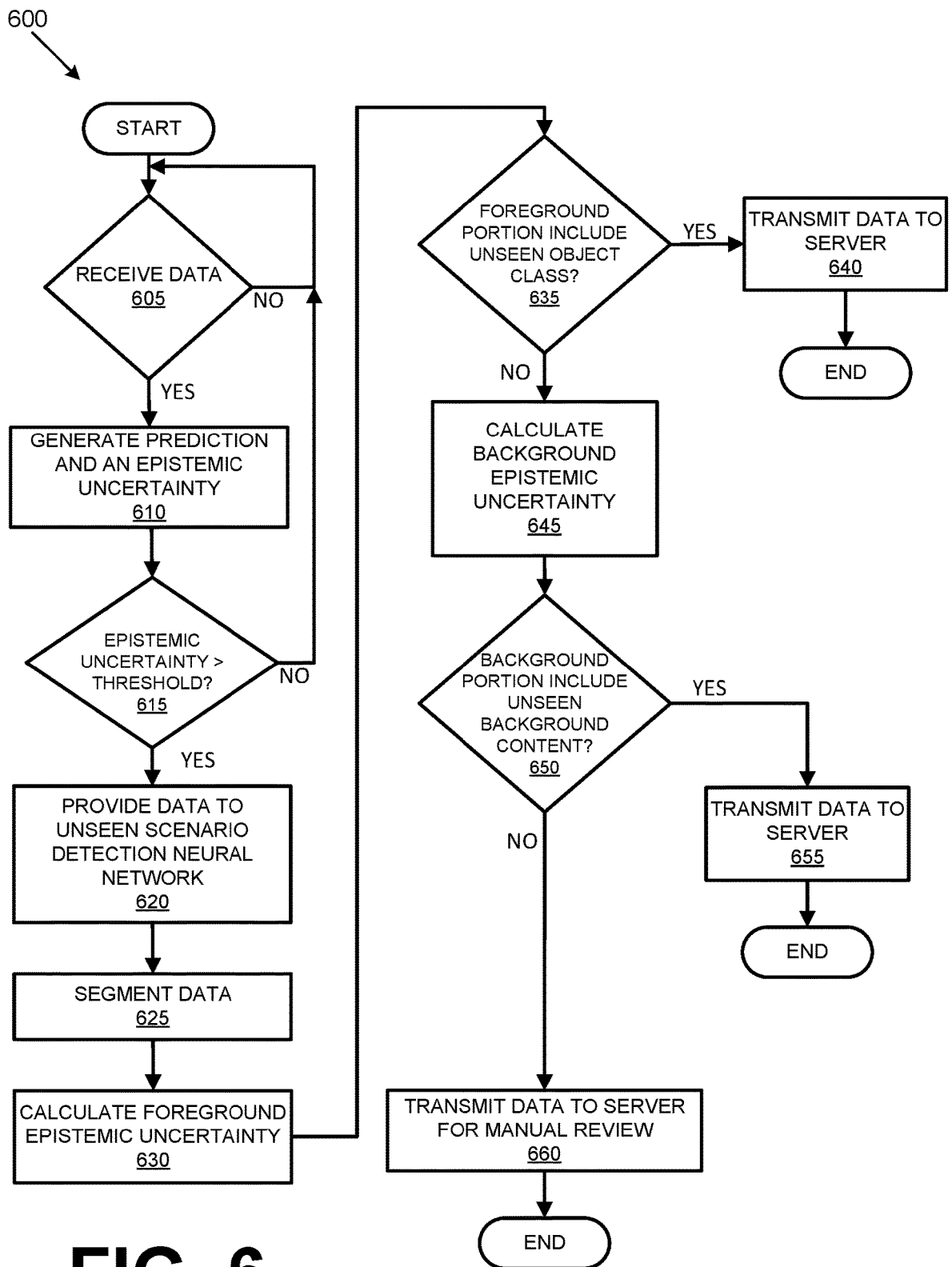

FIG. 6 is a flow diagram of an example process 600 for identifying an unseen scenario within data for which one or more deep neural networks have not been trained with. Blocks of the process 600 can be executed by a processor of the computer 110. At block 605 a determination is made whether data is received at the perception network 405. As discussed above, the data may comprise sensor 115 data, such as an image or a point cloud. If no data has been received, the process 600 returns to block 605. Otherwise, at block 610, the perception network 405 can generate a prediction based on the received data and an epistemic uncertainty for the prediction. For example, the perception network 405 can receive the sensor 115 data and use the trained probabilistic neural network 407 to predict objects in the perceived vehicle environment. The probabilistic neural network 407 can also generate the epistemic uncertainty for the prediction.

At block 615, the perception network 405 compares the epistemic uncertainty to an epistemic uncertainty threshold. If the epistemic uncertainty is greater than the epistemic uncertainty threshold, the data is provided to the unseen scenario detection neural network 410 at block 620. If the epistemic uncertainty is less than or equal to the epistemic uncertainty threshold, the process 600 returns to block 605. In examples where the epistemic uncertainty is less than or equal to the epistemic uncertainty threshold, the predicted objects can be output to a computer 110 in a vehicle 105 and used to operate the vehicle 105.

At block 625, the segmentor 415 segments the data into a foreground portion and a background portion. The foreground portion can be provided to the foreground autoencoder 420, and the background portion can be provided to the background autoencoder 425. At block 630, the foreground autoencoder 420 calculates a foreground epistemic uncertainty by comparing a reconstructed foreground portion to the input foreground portion. At block 635, the foreground autoencoder 420 determines whether the foreground portion includes an unseen object class based on a comparison of the foreground epistemic uncertainty to the foreground epistemic uncertainty threshold. For example, if the foreground epistemic uncertainty is greater than the foreground epistemic uncertainty threshold, the foreground autoencoder 420 classifies the input data as including an unseen object class. At block 640, the foreground autoencoder 420 causes the perception network 405 to transmit the input data received at block 605 to the server 145 such that the perception network 405 can be trained with data including the unseen object class, and the process 600 ends. In some instances, data including the unseen object class may be labeled with a corresponding object class prior to training.

At block 645, the background autoencoder 425 calculates a background epistemic uncertainty. At block 650, the background autoencoder 425, determines whether the background portion includes an unseen background content based on a comparison of the background epistemic uncertainty to the background epistemic uncertainty threshold. For example, if the background epistemic uncertainty is greater than the background epistemic uncertainty threshold, the background autoencoder 425 classifies the input data as including unseen background content. At block 655, the background autoencoder 425 causes the perception network 405 to transmit the input data received at block 605 to the server 145 such that the perception network 405 can be trained with data including the unseen background content, and the process 600 ends. In some instances, data including the unseen background content may be labeled with a corresponding background content label prior to training.

At block 660, the perception network 405 flags the input data received at block 605 for manual review and transmits the flagged input data to the server 145. If the epistemic uncertainty is within the threshold for both the foreground and background content individually but the overall epistemic uncertainty determined by perception network 405 is still higher than expected, then these images are tagged for manual review and understanding. In this instance, the foreground epistemic uncertainty and the background epistemic uncertainty were less than or equal to the respective epistemic uncertainty threshold indicating that the autoencoders 420, 425 were previously trained with data corresponding to the segmented portions, but the overall epistemic uncertainty as determined by perception network 405 is greater than a threshold. In this instance the image data can be transmitted to a server 145 via network 135. The server 145 can use the image data to retrain the perception network 405 and the unseen scenario detection neural network 410, for example. The process 600 then ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising: a computer including a processor and a memory, the memory including instructions executable by the processor such that the processor is programmed to:
   process vehicle sensor data with a deep neural network to generate a prediction indicative of one or more objects based on the vehicle sensor data and determine an object uncertainty corresponding to the prediction;
   then, upon determining that the object uncertainty is greater than an uncertainty threshold:
      segment the vehicle sensor data into a foreground portion and a background portion;
      classify the foreground portion as including an unseen object class when a foreground epistemic uncertainty is greater than a foreground epistemic uncertainty threshold;
      classify the background portion as including unseen background when a background epistemic uncertainty is greater than a background epistemic uncertainty threshold; and
      transmit the data and a data classification to a server.

2. The system of claim 1, wherein the processor is further programmed to operate a vehicle based on the prediction indicative of one or more objects.

3. The system of claim 1, wherein the object uncertainty is a probability that the prediction indicative of one or more objects correctly identifies the one or more objects.

4. The system of claim 1, wherein the foreground epistemic uncertainty is a probabilistic measure of how well the one or more objects are represented in a training data distribution.

5. The system of claim 1, wherein the background epistemic uncertainty is a probabilistic measure of how well noise factors are represented in a training data distribution, wherein noise factors include weather conditions, lighting conditions, and surface conditions.

6. The system of claim 1, wherein the processor is further programmed to:
   map the foreground portion to a latent representation;
   map the latent representation to a reconstruction of the foreground portion; and
   determine the foreground epistemic uncertainty based on a comparison of a reconstructed foreground portion with the foreground portion.

7. The system of claim 1, wherein the processor is further programmed to:
   map the background portion to a latent representation;
   map the latent representation to a reconstruction of the background portion; and
   determine the background epistemic uncertainty based on a comparison of a reconstructed background portion with the background portion.

8. The system of claim 1, wherein the vehicle sensor data comprises at least one of an image or a point cloud.

9. The system of claim 1, wherein the deep neural network includes a probabilistic neural network.

10. The system of claim 1, wherein the processor is further programmed to segment, via a segmentor, the vehicle sensor data into the foreground portion and the background portion via a segmentation mask.

11. The system of claim 10, wherein the segmentation mask comprises a binary mask that classifies objects within the vehicle sensor data, wherein the classified objects are assigned to the foreground portion.

12. The system of claim 10, wherein the segmentor comprises a Mask R-convolutional neural network (Mask R-CNN).

13. A method comprising:
   processing, by a processor, vehicle sensor data with a deep neural network to generate a prediction indicative of one or more objects based on the data and determine an object uncertainty corresponding to the prediction;
   when the object uncertainty is greater than an uncertainty threshold:
      segmenting the vehicle sensor data into a foreground portion and a background portion;
      classifying the foreground portion as including an unseen object class when a foreground epistemic uncertainty is greater than a foreground epistemic uncertainty threshold;
      classifying the background portion as including unseen background when a background epistemic uncertainty is greater than a background epistemic uncertainty threshold; and
      transmitting the data and a data classification to a server.

14. The method of claim 13, wherein a vehicle is operated based on the prediction indicative of one or more objects.

15. The method of claim 13, wherein the object uncertainty is a probability that the prediction indicative of one or more objects correctly identifies the one or more objects.

16. The method of claim 13, wherein the foreground epistemic uncertainty is a probabilistic measure of how well the one or more objects are represented in a training data distribution.

17. The method of claim 13, wherein the background epistemic uncertainty is a probabilistic measure of how well noise factors are represented in a training data distribution, wherein noise factors include weather conditions, lighting conditions, and surface conditions.

18. The method of claim 13, further comprising:
mapping the foreground portion to a latent representation;
mapping the latent representation to a reconstruction of the foreground portion; and
determining the foreground epistemic uncertainty based on a comparison of the reconstructed foreground portion with the foreground portion.

19. The method of claim 13, further comprising:
mapping the background portion to a latent representation;
mapping the latent representation to a reconstruction of the background portion; and
determining the background epistemic uncertainty based on a comparison of the reconstructed background portion with the background portion.

20. The method of claim 13, wherein the vehicle sensor data comprises at least one of an image or a point cloud.

* * * * *